United States Patent [19]

Mitchell et al.

[11] Patent Number: 5,497,679
[45] Date of Patent: Mar. 12, 1996

[54] MOLDED CAMSHAFT ASSEMBLY

[75] Inventors: Robert K. Mitchell, Brookfield, Wis.;
Leonard G. Miller, Orchard Lake Village, Mich.

[73] Assignee: Briggs & Stratton Corporation, Wauwatosa, Wis.

[21] Appl. No.: 255,665

[22] Filed: Jun. 9, 1994

Related U.S. Application Data

[62] Division of Ser. No. 444,839, Dec. 4, 1989, Pat. No. 5,320,795, which is a continuation of Ser. No. 168,142, Mar. 14, 1988, abandoned.

[51] Int. Cl.⁶ .................................................. F16H 53/00
[52] U.S. Cl. ........................... 74/567; 29/888.1; 123/90.6
[58] Field of Search ..................... 74/567, 569, 568 R; 264/318, 328.16, 334; 123/508, 90.6 X; 29/888.1

[56] References Cited

U.S. PATENT DOCUMENTS

| | | | |
|---|---|---|---|
| 2,884,661 | 5/1959 | Hurley | 74/595 |
| 3,911,761 | 10/1975 | Cornellier | 74/567 X |
| 4,097,702 | 6/1978 | Halsted | 74/567 |
| 4,127,632 | 11/1978 | Anger . | |
| 4,201,360 | 5/1980 | Schwartzburg et al. . | |
| 4,414,171 | 11/1983 | Duffy et al. . | |
| 4,453,507 | 6/1984 | Braun et al. . | |
| 4,521,367 | 6/1985 | Underwood . | |
| 4,630,498 | 12/1986 | Santi . | |
| 4,655,984 | 4/1987 | Hintoa et al. . | |
| 4,709,757 | 12/1987 | Bly . | |
| 4,731,014 | 3/1988 | Von Holdt . | |
| 4,741,088 | 5/1988 | Ramella . | |
| 4,755,109 | 7/1988 | Botts . | |
| 4,768,475 | 9/1988 | Ikemura | 74/567 X |
| 4,777,004 | 10/1988 | Galer . | |
| 4,895,045 | 1/1990 | Stidworthy | 74/567 X |
| 5,041,253 | 8/1991 | Husted | 74/567 X |
| 5,048,366 | 9/1991 | Spanio | 74/568 R X |
| 5,109,726 | 5/1992 | Ohlendorf et al. | 74/567 |
| 5,243,869 | 9/1993 | Kukowski | 74/567 X |
| 5,253,546 | 10/1993 | Elrod et al. | 74/568 R X |
| 5,287,840 | 2/1994 | Catanu et al. | 123/90.6 X |

FOREIGN PATENT DOCUMENTS

| | | | |
|---|---|---|---|
| 529071 | 7/1931 | Germany | 74/567 |
| 3705114 | 9/1988 | Germany | 74/567 |
| 55-78114 | 6/1980 | Japan | 74/567 |
| 55260 | 8/1943 | Netherlands | 74/567 |

OTHER PUBLICATIONS

IBM Technical Disclosure Bulletin, vol. 18, No. 11, (Apr. 1976) p. 3535, Title "Print Noise Reduction".

"Camshafts Made From Non–Metallic Materials For Small Engines", Robert K. Mitchell, Soc. of Automotive, Eng., SAE Tech. Papers Series No. 861243, Sep. 1986.

"Processing Tips For Molding Fibert Glass Reinforced Thermoplastics", LNP Corp., 1983, adapted from an article in Plastics Technology Mag. Jul. 1970.

"Properties and Processing of Celanex Thermoplastic Polyester", Celanese Bulletin JIA, pp. 37–38, Feb. 1984.

"General Design Principles", Design Handbook for DuPont Engineering Polymers, pp. 21–22 (no publication date in handbook).

*Primary Examiner*—Vinh T. Luong
*Attorney, Agent, or Firm*—Michael, Best & Friedrich

[57] ABSTRACT

A camshaft assembly for an internal combustion engine includes a rotatable camshaft and a cam lobe mounted on the camshaft for rotation therewith. The cam lobe includes first and second axial ends and an integral crowned cam profile formed in its periphery which includes a radially extending shoulder located between the first and second ends. The shoulder may be formed by a pair of axially extending parallel tapered surfaces in the cam profile.

11 Claims, 3 Drawing Sheets

MOLDED CAMSHAFT ASSEMBLY

This application is a division of prior application Ser. No. 07/444,839 filed Dec. 4, 1989, now U.S. Pat. No. 5,320,795, which in turn was a continuation of application Ser. No. 07/168,142 filed Mar. 14, 1988, now abandoned.

BACKGROUND OF THE INVENTION

The present invention relates to camshaft assemblies, and more particularly to a molded camshaft assembly for an internal combustion engine.

Small internal combustion engines, such as those used on lawn mowers and snow blowers, generally include a cam gear and at least one cam lobe mounted on a camshaft. The camshaft is rotated by means of the cam gear, which, as is conventional, meshes with a timing gear on a crankshaft to rotate in timed relation to the engine cycle. The cam lobe is used to control an exhaust and an intake valve, as is also conventional.

In the past, such cam lobes have been formed of metallic materials utilizing time consuming and expensive precision machining methods. For example, metallic cam lobes are generally made by utilizing a hobbing machine to cut the cam lobe from a solid piece of metal. Hobbing cam lobes may also result in undesirable high waste or scrap material which further increases their cost of manufacture.

More recently, it has been found that non-metallic cam lobes may be molded from plastics material with sufficient accuracy for small internal combustion engines. Such molded non-metallic cam lobes provide for reduced noise and lower cost compared with metallic cam lobes.

When the camshaft rotates in timed relation to the engine cycle, the cam lobe rotates therewith and acts through cam followers that are positioned to ride on the peripheral surface or profile of the cam lobe and are operatively connected with valves that are cyclically opened when the engine is running to control the intake and exhaust systems of an internal combustion engine. If the follower rides on the edge of the cam lobe, excessive stress and pitting of the peripheral surface of the cam profile may occur. Crowning of the cam profile generally helps to solve this problem. Crowning provides a profile such that the highest point of the cam lobe's peripheral surface which contacts the cam follower is at or near the center of the lobe. In order to crown the cam profile utilizing a conventional molding process, the die tooling typically becomes more expensive and complex with the result that only two cavities may be utilized with such mold compared with four cavities with simpler tooling. More specifically, if the cam mold tooling may be pulled off axially, the tooling is less expensive and complex and four cavities may used in the mold. Normally, however, if axially movable tooling would be utilized to mold a cam lobe, the cam profile cannot be crowned since crowning would normally require the mold tooling to be pulled off radially at 90° to the camshaft axis. As a result, conventional molding techniques would require that a cam lobe have an axially tapered cam profile to allow the tooling to be pulled off axially. Unfortunately, with an axially tapered cam profile the follower would ride on the high edge of the cam profile causing excessive wear and pitting, as noted above.

It is therefore desirable to provide a cam lobe which may be molded of non-metallic materials using a relatively inexpensive molding process which would provide a cam profile that avoids or eliminates excessive wear.

SUMMARY OF THE INVENTION

A camshaft assembly for an internal combustion engine.

In one aspect, the invention comprises a method of molding a camshaft assembly which includes a camshaft and integral cam lobe for an internal combustion engine. The steps include providing a mold including a die component closable to define a mold cavity having a first portion in the shape of a camshaft which defines an axis of rotation and a second portion in the shape of a cam lobe which includes a crowned cam profile, filling the mold cavity with a shrinkable fluid plastics material, waiting a predetermined period of time to permit the plastics material in the second portion of the mold cavity to harden and shrink, and moving the die component in an axially direction to open the mold. The fluid plastics material has a shrinkage rate of at least about 0.000067 inches per second, and preferably comprises a heated molten plastics material such as unreinforced or reinforced nylon. When utilizing a heated molten plastics material with suitable shrinkage characteristics such as nylon, the step of waiting includes cooling the molten material for a period of time between 0 and 30 seconds, preferably less than 5 seconds. Also, the filling step preferably is accomplished via injection molding techniques.

In another aspect of the invention, the camshaft assembly includes a camshaft defining an axis of rotation, and a stepped cam lobe mounted on the camshaft for rotation therewith having first and second axial ends. The stepped cam lobe has an integral cam profile formed in its peripheral surface which includes a shoulder located between the first and second ends of the cam lobe which has a radial dimension equal to or greater than the radial dimension of the first and second ends.

The stepped cam profile includes first and second axially extending tapered surfaces with the first tapered surface extending axially from the first end to the shoulder, and the second tapered surface extending axially from the shoulder to the second end of the cam lobe. Additionally, the first and second tapered surfaces of the cam profile generally extend parallel to one another. The stepped profile causes a tappet follower to contact the cam profile away from the edge of the cam so that the cam follower rides away from the cam surface edge to reduce wear and to enable the cam lobe to be produced by a relativley inexpensive molding technique.

In a modified form of the stepped profile, the step in the central region of the profile is molded with exterior and interior radii to smooth the transition.

In yet another aspect of the invention, the camshaft assembly comprises a metal camshaft together with an all-plastic cam assembly mounted on the camshaft for rotation therewith. Such a camshaft assembly is referred to herein as a "composite" assembly. The all-plastic cam assembly includes a cam gear, an exhaust cam lobe and an intake cam lobe, each of which is axially spaced apart from one another and integrally interconnected by a hollow sleeve member which surrounds the metal camshaft. Additionally, in still another aspect of the invention, the entire camshaft assembly including both the cam assembly and the camshaft is composed of a plastics material and formed integrally with the journal bearing ends of the sleeve member. Thus, an all-plastic camshaft assembly is provided wherein the intake cam lobe, the exhaust cam lobe, the cam gear and the camshaft are each composed of a plastics material and integrally formed together as a one-piece assembly.

Benefits of making the camshaft assembly in either the composite form or entirely of non-metallic or plastics material include:

1. Quiet operation, due to resilient, damped gear tooth and bearing non-metallic material used.
2. Quiet operation, due to low inertia and light weight of non-metallic material used.
3. Quiet operation, due to smooth surface finish achievable in molding of non-metallic material.
4. Desirable smooth surface finish is achievable as molded; thus expensive grinding is not needed on cam lobes and bearing journals as would be required with metal camshaft assemblies.
5. The levels of geometric accuracy and precision normally required for metal cam gear teeth and camshaft assembly bearings are not required for camshaft assemblies made of plastics or non-metallic materials, because noise is not as sensitive to accuracy and precision when non-metallics are used. For example, small nicks or gouges on gear teeth or cam lobes will heal during normal operation, and will not cause excessive noise.
6. Bearings need not be as accurate because resilient materials will facilitate small deformations which will facilitate load sharing and elastohydrodynamic action, allowing the bearings to carry unusually high bearing loads without excessive wear.
7. Camshaft assemblies made of plastics or non-metalic materials are less sensitive to stresses because the relatively resilient material will deform slightly and spread the loads of mating gear teeth and valve tappets.
8. To minimize stress and to promote low vibration and noise, it is desirable to utilize polynomial cam lobe profiles, and to crown the lobes. If the lobes are crowned, the cam followers run at or near to the lobe axial centers, and the force application points will not move back and forth on the lobes.

Though normally these geometric shapes are expensive to achieve when using metals since expensive grinding is normally required, these shapes can be molded into the camshaft assembly at no extra cost using plastics or non-metallic materials.

Crowning the lobes also has a beneficial effect to compensate for "sinking", which causes undesirable depressions in the middle of the lobes, caused by shrinkage during cooling. The material in the center of the lobes cools last, resulting in depressions unless the lobes are crowned.

9. To minimize gear tooth stress which promotes long life, it is desirable that a full root radius be used. Though normally this would require expensive unusual tooling to be used with metallic materials, it can be molded at no significant extra cost into a part made of plastics or non-metallic material.
10. Conical, or tapered gear teeth are desirable to promote low noise due to improved tooth load pick-up and improved lubrication. Though normally with metallic gears this shape would be difficult to obtain, it can be easily achieved with molded plastics or non-metallic cam gear assemblies.
11. Compression-release function desired for easy engine starting can be achieved with camshaft assemblies made of plastic at no extra cost by molding small bumps into the intake or exhaust cam lobe profiles. In contrast, this would normally require extra effort to grind these shapes into the cam lobe profiles of a metallic camshaft assembly.
12. Significant noise and noise quality improvements can be achieved using plastics or non-metallics in camshaft assemblies, because the contacts with mating parts of gear teeth, journal bearings, thrust bearings and cam lobes are made with resilient, damped material.
13. Use of plastics or non-metallic materials promotes improved life of mating parts of the engine because the plastics or non-metallic material has a low-friction, non-abrasive rubbing action if any contact is made.
14. Camshaft assemblies made of plastics or non-metallic materials can be design-optimized for use on relatively low-speed engines (less than 5,000 rpm and preferably less than about 4,000 rpm) used for lawn-mowing applications. Metallic camshaft assemblies tend to be over designed and relatively expensive for this application.
15. Camshaft assemblies made of plastics or non-metallic materials can be design-optimized for use on relatively short (but adequate) life engines (1,000 to 3,000 hours) used for lawn-mowing applications. Metallic camshaft assemblies tend to be over designed and relatively expensive for this application.
16. Gear diameter is usually a highly critical dimension when metal gears are used, because of noise, stress, wear and life considerations. When plastics or non-metallics materials are used for the cam gear the successful operation is not as sensitive to this dimension. Noise, stress, wear and life appear to still be adequate, in spite of high or low back lash, or even gear tooth interference. In addition to diameter, the gears do not have to be as round as they have to be when metal gears are used.
17. When plastics or non-metallic materials are used for gear teeth, and loading occurs, as in a power take-off or auxiliary drive application, the teeth can bend slightly, sharing the load, minimizing wear, extending life and minimizing noise.
18. Low-cost tooling can be used to take advantage of the inherent shrinkage of the polymer resins.
19. Camshaft assemblies made entirely of plastics or non-metallic materials and with adequate life and quality can be manufactured at much lower cost than with metals.

The non-metallic materials that would be considered for the making of engine camshaft assemblies might include various grades of thermoplastic resins such as: nylon (castable and/or injection moldable grades), phenolics, liquid crystal polymers, and polyamide-imide. In addition, various polymer blends might be considered. Various fillers, powders, reinforcement fibers, and solid lubricants might also be considered.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figures 1, 2, 3, 4, 5:
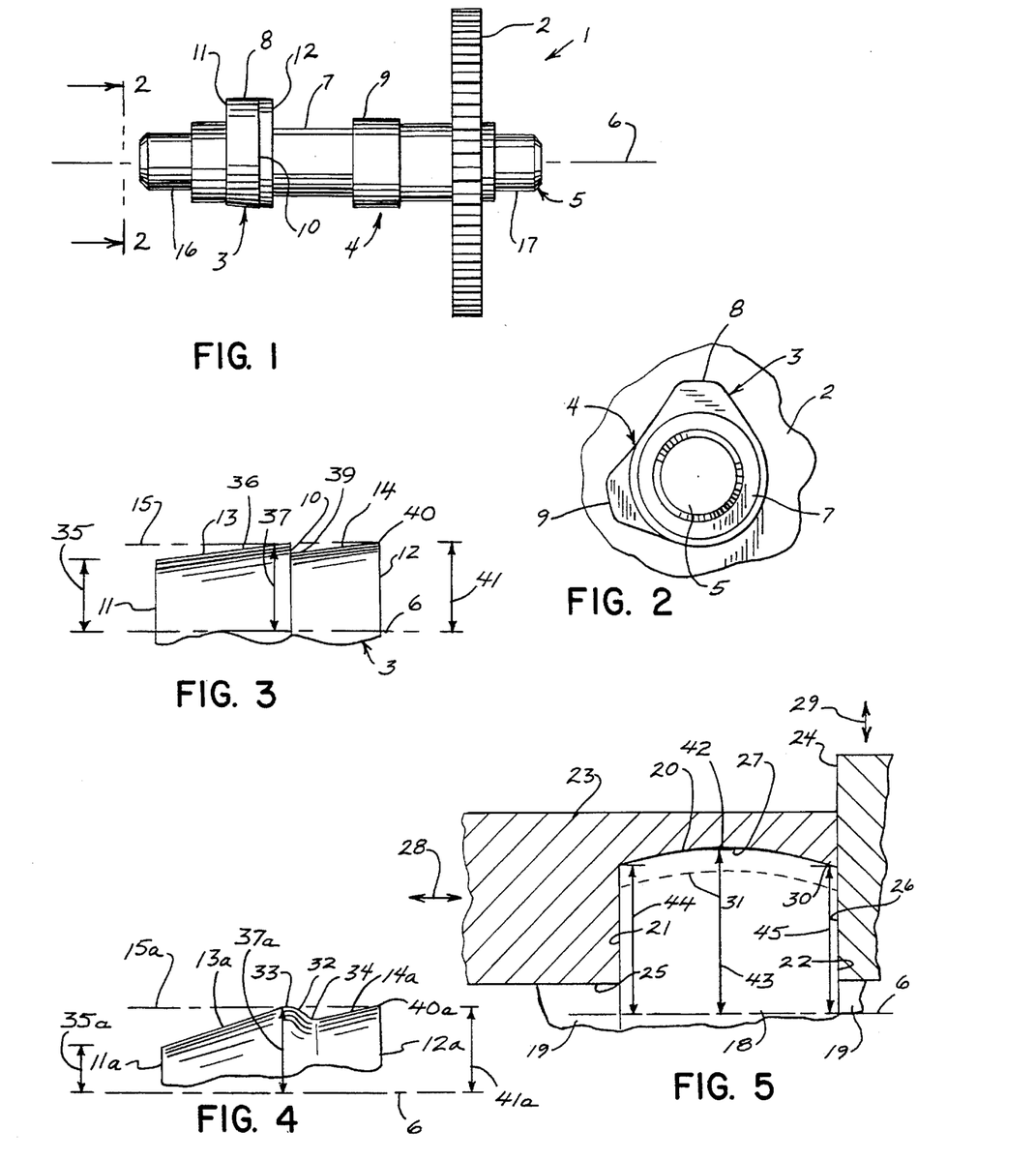
FIG. 1 is a side view in elevation of a composite camshaft assembly including a stepped cam lobe in accordance with the present invention.
FIG. 2 is a fragmentary end view of the camshaft assembly of FIG. 1 taken along the plane of the line 2—2 in FIG. 1.
FIG. 3 is a fragmentary enlarged side view in elevation of the stepped cam profile for the cam lobe of FIG. 1.
FIG. 4 is a fragmentary enlarged side view in elevation of a modified stepped cam profile for the cam lobe of FIG. 1.
FIG. 5 is a fragmentary enlarged cross sectional view showing the die components of a mold in their closed position for making the camshaft assembly of the present invention which illustrates a third embodiment of a cam lobe having an arcuate cam profile.

Referring now to the drawings, FIG. 1 illustrates a camshaft assembly, generally designated by the numeral 1, constituting a preferred embodiment of the present invention. The camshaft assembly 1 shown in FIG. 1 is specifically adapted for use in a small internal combustion engine of the type generally utilized with lawn mowers and snow blowers. However, as is readily obvious to those skilled in the art, the camshaft assembly 1 of the present invention may be adapted for use with other types of internal combustion engines as well as other types of apparatus.

Camshaft assembly 1 includes a cam gear 2, an intake cam lobe 3 and an exhaust cam lobe 4 mounted on a camshaft 5 of an internal combustion engine. The camshaft 5 is rotated about an axis of rotation 6 in timed relation to the engine cycle by means of cam gear 1, as is conventional, which meshes with a timing gear (not shown) on the engine crankshaft. Camshaft 5 includes journals 16, 17 at opposite ends thereof for supporting camshaft assembly 1 in bearings (not shown) in the engine housing, as is conventional. Cam lobe 3 is used to control an intake valve (not shown) while cam lobe 4 is used to control an exhaust valve (not shown), as is also conventional.

In the embodiment illustrated in FIG. 1, cam gear 2 and cam lobes 3 and 4 are integrally molded together of a plastics material, such as reinforced or unreinforced nylon, as a one-piece assembly and are interconnected by means of a hollow sleeve 7 to form an integral all-plastic cam assembly. Camshaft 5, in turn, consists of a unitary solid member composed of a metallic material, and is of circular cross section about which the integral cam assembly consisting of cam gear 2, cam lobes 3 and 4 and sleeve 7 are fixedly mounted. This camshaft assembly is referred to herein as a "composite" camshaft assembly.

Figure 7:
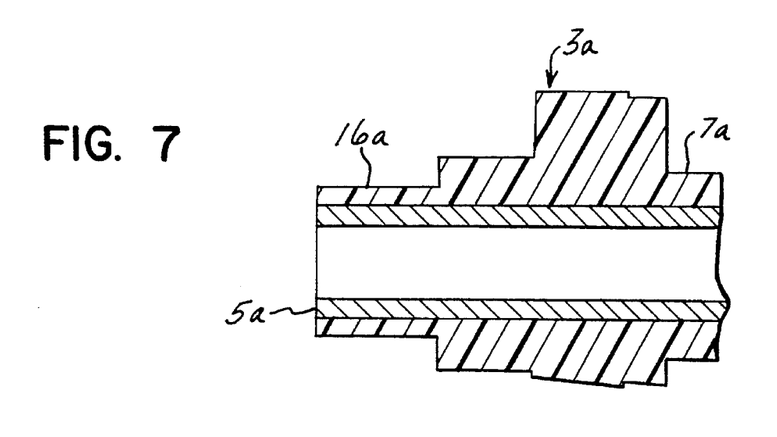
FIG. 7 is a fragmentary cross sectional view similar to FIG. 6 of a second embodiment of a composite camshaft assembly utilizing a tubular metal support insert.

Referring now to FIG. 7, there is illustrated a second embodiment of a composite camshaft assembly. In this second embodiment, camshaft 5a consists of a unitary tubular member composed of a metallic material, and is of circular cross section about which the integral cam assembly consisting of the cam gear, cam lobes (only intake cam lobe 3a being shown) and sleeve 7a are fixedly mounted. Note that the ends of camshaft 5a are covered by plastics material to form the journals (only journal 16a being shown). Thus, camshaft 5a functions merely as a stiffening or support insert in this embodiment.

Figure 8:
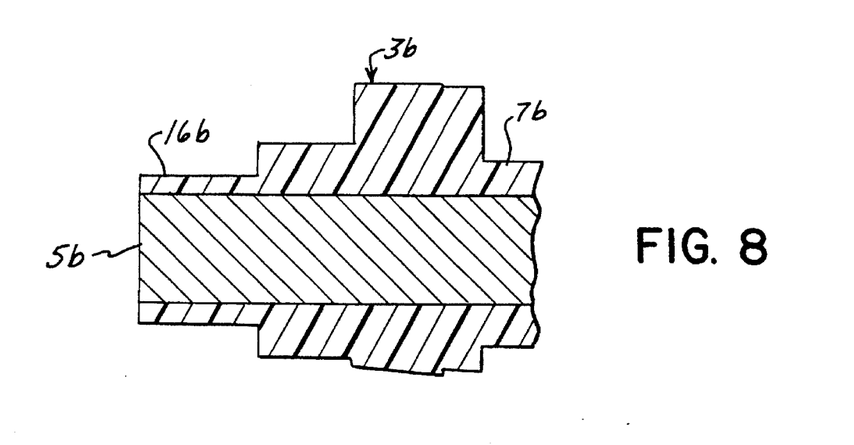
FIG. 8 is a fragmentary cross sectional view similar to FIGS. 6 and 7 of a third embodiment of a composite camshaft utilizing a solid metal support insert.

FIG. 8 illustrates a third embodiment of a composite camshaft assembly, and shows an intake cam lobe 3b, sleeve 7b and journal 16b of an integral plastics cam assembly fixedly mounted on a camshaft 5b. This third embodiment is thus similar to the second embodiment of FIG. 7 except camshaft 5b is a unitary solid metallic member of circular cross section. Additionally, and similar to the second embodiment, camshaft 5b functions merely as a stiffening or support insert.

Figure 9:
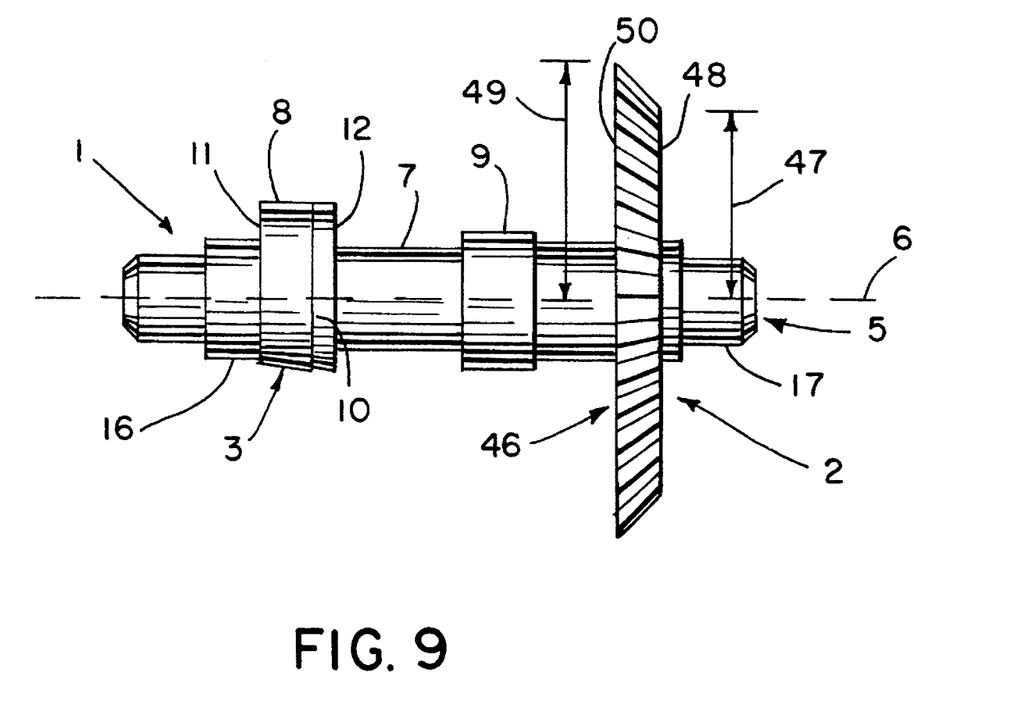
FIG. 9 is a side view of a camshaft assembly which includes a cam gear that may be used in the present invention.

FIG. 9 is a side view of a cam gear that may be used with the present invention. In FIG. 9, cam gear 2 includes a plurality of axially extending, radially projecting teeth 46 disposed circumferentially around the periphery of cam gear 2. Teeth 46 are tapered along their axially length so that their radially outer first distance 47 from axis 6 at side 48 of gear 2 is less than the radially outer second distance 49 from axis 6 at side 50 of gear 2.

Figure 6:
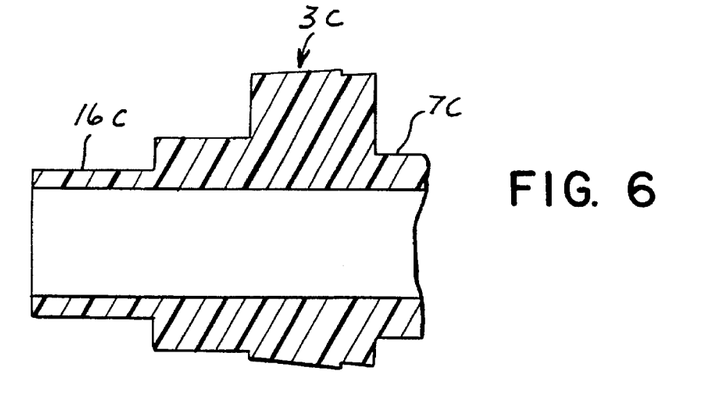
FIG. 6 is a fragmentary cross sectional view of an all-plastic camshaft assembly.

It should be noted, however, that camshaft 5 may also be composed of a plastics material such as reinforced or unreinforced nylon, as well as other plastics materials, if desired. Under such circumstances, camshaft 5 would not consist of a separate metallic member as shown in FIGS. 1, 7 and 8 extending through sleeve 7 and the entire integral cam assembly. Instead, hollow sleeve 7 would essentially become the camshaft with journals 16, 17 also comprising hollow members integrally attached to opposite ends of sleeve 7 to form an integral one-piece "all-plastic" camshaft assembly. This all-plastic camshaft assembly is illustrated in FIG. 6 showing an intake cam lobe 3c, sleeve 7c and journal 16c.

The non-metallic materials that would be considered for the making of either the composite or all-plastic engine camshaft assemblies might include various grades of thermoplastic resins such as: nylon (castable and/or injection moldable grades), phenolics, liquid crystal polymers, and poly-amide-imide. In additon, various polymer blends might be considered. Various fillers, powders, reinformcement fibers, and solid lubricants might also be considered.

Castable nylon performs quite well, but the processing appears to be relatively expensive. Phenolic material cost is relatively low, but processing involves relatively high cost because of relatively long mold cycle times. The phenolic material can be molded very accurately, but it is very hard and brittle. To improve toughness, it preferably is reinforced with glass or other fiber, or fiberglass cloth. These reinforcing materials, however, may increase cost and/or cause abrasive wear of mating parts. Liquid crystal polymers (LCP'S) would perform well in the engine. However, they are fairly new, and material cost appears to be relatively high. Poly-amide-imide material (trade name "TORLON Plastic") appears to have excellent high temperature strength, but it appears to be somewhat hard and brittle, and cost also appears to be relatively high. Injection moldable nylon performs well, and costs of material and processing are relatively low. Stresses appear to be at or beyond recommended limits at engine operating temperatures, but the cam life still appears to be adequate. Injection molded nylon appears to be the best choice for small engines without "over-design", and high shrinkage in the mold makes possible the use of low-cost tooling.

As shown best in FIG. 2, cam lobes 3 and 4 include profiles 8 and 9, respectively, about their outer peripheral surfaces upon which the tappet follower (not shown) of the respective intake and exhaust valves ride for controlling the flow of gases between intake and exhaust ports communicating with the engine combustion chamber. As shown, the projecting portions of cam lobes 3, 4 are offset with respect to one another about 90° so as to cyclically open its respective valve during engine operation, as is conventional.

Referring now to FIG. 3, there is illustrated in detail cam profile 8. As shown, cam profile 8 is "stepped" and includes a shoulder 10 formed in the peripheral surface of cam profile 8 between opposite first axial end 11 and second axial end 12 of cam lobe 3. Shoulder 10 is defined by a first axially extending tapered surface 13 and a second axially extending tapered surface 14 which extends parallel to tapered surface 13. In FIG. 3, first axial end 11 extends a first radial distance 35 from axis of rotation 6. As shown, first tapered surface 13 extends axially from first axial end 11 of cam lobe 3 to the upper edge 36 of shoulder 10 such that upper edge 36 extends a third radial distance 37 from axis 6. Third radial distance 37 is greater than or equal to first radial distance 35.

In FIG. 3, second tapered surface 14 extends axially from shoulder 10 to the opposite, second axial end 12 of cam lobe 3. Second tapered surface 14 extends from the lower edge or radially inner edge 39 of shoulder 10 to the edge 40 of second axial end 12 such that edge 40 is located at a second radial distance 41 from axis 6 that is equal to or less than third radial distance 37, as best shown by horizontal line 15 in FIG. 3. As best shown in FIG. 1, shoulder 10 extends around the entire profile 8 of cam lobe 3.

Referring to FIG. 4, there is illustrated an alternate form of cam profile 8. The stepped profile 8 of FIG. 4 is similar to that illustrated in FIG. 3 and therefore like numerals except with the subscript "a" are utilized for like elements. However, step or shoulder 10 of profile 8 in FIG. 3 is replaced by a transition shoulder or step 32 including external. radius 33 and internal radius 34.

Referring now to FIG. 5, there is illustrated a fragmentary view showing a portion of the mold for making camshaft assembly 1. More specifically, FIG. 5 illustrates a cam lobe 18 integrally molded together with a hollow sleeve 19 in a manner similar to that shown in FIG. 1, except that profile 20 of cam lobe 18 is "arcuate" in shape instead of being "stepped" in shape.

As illustrated, the apex 42 of profile 20 has a radial distance 43 from axis 6 that is equal to or greater than the radial distances 44, 45 of respective axial ends 21, 22 from axis 6. This arcuate shape of the peripheral surface of cam profile 20 extends around the entire profile 20 of cam lobe 18.

It should be noted that both the stepped cam profile 8 (see FIGS. 3 and 4) as well as the arcuate profile 20 (see FIG. 5).may be defined as illustrating "Crowned" cam lobes. Thus, the term "crowned cam profile" includes both the stepped profiles of FIGS. 3 and 4 as well as the arcuate profile of FIG. 5 so long as the high point of the profile has a radial dimension equal to or greater than the radial dimension of either of the opposite ends of the cam lobe.

Referring once again to FIG. 5, the mold shown therein includes an axially movable die component 23, and a radially movable die component 24 which form a mold cavity having a first portion 25 in the shape of sleeve 19 and a second portion 26 in the shape of cam lobe 18 which, as illustrated, includes a "crowned" cam profile, i.e. in this case arcuate shaped. Thus, the second portion 26 of the mold cavity has an arcuate shaped surface 27 corresponding to profile 20 of cam lobe 18.

As illustrated, die component 23 is movable axially in the direction illustrated by arrow 28, and die component 24 is movable radially as illustrated by the arrow 29. However, under normal molding circumstances, die component 23 may not be moved axially since portion 30 thereof would not clear the apex of cam profile 20 after molding, as is clearly evident from the fact that portion 30 extends radially inwardly of the apex of profile 20. Therefore, in order to permit die component 23 to be pulled off axially, the present invention includes a method of molding camshaft assembly 1 such that the mold cavity is filled with a shrinkable fluid plastics material, and thereafter waiting a predetermined period of time to permit the plastics material in cam lobe portion 26 of the mold cavity to simultaneously solidify and shrink so that the apex of profile 20 of cam lobe 18 after shrinking is radially inwardly of the lower edge of portion 30 of die component 23, as indicated by the dotted line 31 in FIG. 5. In order to accomplish this, the fluid plastics material must have a shrinkage rate of at least about 0.000067 inches per second. If the material does not have such a shrinkage rate, the cycle time for manufacturing such camshaft assemblies becomes excessively long and as a result more expensive. Such materials are typically heated molten plastics material injected into the mold cavity. Typical of such plastics material is a nylon based material such as reinforced or unreinforced nylon or a blend of nylon with other plastics materials so long as the blend has the above shrinkage rate characteristic. The waiting time enables the molten material to cool for a period of time between 0 and 30 seconds, preferably less than 5 seconds, so that the material shrinks sufficiently to enable die component 23 to be moved axially to open the mold cavity. As is apparent, the mold cavity must be initially over dimensioned so that upon shrinkage the proper radial dimension of cam lobe 18 is obtained.

In order to demonstrate the advantages of making the camshaft assembly or the cam gear assembly entirely of non-metallic or plastics material to form either a composite or an all-plastic camshaft assembly, numerous sound tests were performed and various noise data was collected. Table I illustrates a competitive engine evaluation which includes various small engines typically utilized for lawn and garden type applications.

TABLE I

| Competitive Engine Noise Evaluation 4 Meter Energy Average (dB) | | | |
|---|---|---|---|
| Engine Make, Model | 3200 RPM | 3000 RPM | 2700 RPM |
| Engine #1, 1 | 73.8 | 72.5 | 70.9 |
| BRIGGS & STRATTON MAX-40 engine | 73.5 | 72.5 | 71.0 |
| Engine #2, 1 | 72.1 | 71.6 | 71.2 |
| Engine #3, 1 OHV | 72.1 | 71.1 | 69.9 |
| Engine #3, 2 2-Stroke | 71.6 | 70.9 | 69.7 |
| BRIGGS & STRATTON QUANTUM | 70.7 | 69.7 | 67.5 |
| Engine #4, 1 OHV | 69.5 | 68.5 | 67.5 |
| Engine #4, 2 OHV Mower w/o Blade | 70.4 | — | 68.7 |
| Engine #4, 3 OHV Mower w/o Blade | — | — | 67.0 |

In the above Table I, the BRIGGS & STRATTON QUANTUM engine engine has incorporated therein a composite camshaft assembly comprising a metallic camshaft, and an integrally molded cam gear, cam lobes and thrust bearings composed of a nylon material. Table I demonstrates that the BRIGGS & STRATTON QUANTUM engine is significantly quieter with an average decibel reading of 69.3 at 4 meters over an operating range of 2700 to 3200 revolutions per minute.

Table II demonstrates noise data obtained from two different model 929 BRIGGS & STRATTON engines utilizing a composite camshaft assembly similar to that utilized to obtain the data in Table I. The model 929 engine included a muffler, intake silencer, and its drive shaft was loaded with only an inertia disk. The noise data was taken at a 4 meter distance over a range of 2700, 3000 and 3300 revolutions per minute.

TABLE II

Composite Camshaft Noise Tests
BRIGGS & STRATTON Model 929 Engine
Muffler, Intake Silencer, Inertia Disk Load

| | 4 M. Energy Average (dB) | | |
|---|---|---|---|
| | 3300 RPM | 3000 RPM | 2700 RPM |
| 1. Engine #1, with Std. Metal Assembly | 73.1 | 71.6 | 70.2 |
| 2. Engine #1, with Composite Assembly | 70.5 | 68.6 | 66.7 |
| 3. Engine #2, with Std. Metal Assembly | 72.5 | 71.4 | 70.6 |
| 4. Engine #2, with Composite Assembly | 69.6 | 68.2 | 67 |

As can be seen from the above data in Table II, the camshaft assembly of the present invention significantly reduces the noise emanating from an engine.

The following Table III was another test performed to obtain noise data on a model 94908 BRIGGS & STRATTON engine including an air vane governor thereon. The tests were performed with different types of camshaft assemblies with the pinion on the crankshaft which drove the cam gear having various mounting arrangements. The noise data was obtained at 4 meters over a range of 2400 to 3200 revolutions per minute.

TABLE III

Camshaft Noise Tests
Briggs & Stratton Model 94908 w/Air Vane Governor
4 M. Energy Average (dB)

| Test | 3200 RPM | 3000 RPM | 2700 RPM | 2400 RPM |
|---|---|---|---|---|
| 1. Standard metal assembly keyed pinion on crankshaft | 70.3 | 69.9 | 68.1 | 67.0 |
| 2. Composite assembly keyed pinion on crankshaft/2 intake springs | 70.1 | 68.9 | 66.9 | 65.6 |
| 3. Composite assembly/integral pinion on crankshaft/2 intake springs | 70.1 | 68.8 | 67.3 | 65.1 |
| 4. Standard metal assembly/integral pinion on crankshaft/standard exhaust spring | 72.9 | 72.1 | 71.1 | 69.8 |

The above data from Table III once again illustrates that a camshaft assembly in accordance with the present invention substantially reduces the noise as compared to standard as well as other types of camshaft assemblies.

Referring now to Table IV, there is shown a further noise comparison between the camshaft assembly of the present invention incorporated in a model 8 BRIGGS & STRATTON quiet engine and a standard model 8 BRIGGS & STRATTON quiet engine. The standard model 8 engine utilized a conventional metallic camshaft assembly. Both engines were fitted with an infinite muffler and an intake silencer. The noise data was taken at a 1 meter distance and the tests were run under full load and no load drive shaft conditions at both 3000 and 3600 rpms.

TABLE IV

Noise Comparison
Composite Camshaft vs. Standard Camshaft
BRIGGS & STRATTON Model 8 Quiet Engines
Infinite Muffler - Intake Silencer
1 M. Energy Average (dB)

| | 3600 RPM | | 3000 RPM | |
|---|---|---|---|---|
| Test | Full Load | No Load | Full Load | No Load |
| 1. Standard Quiet Model 8 (Average of 4) | 82.6 | 79.4 | 81.4 | 77.4 |
| 2. Composite Camshaft TR #10062 | 80.1 | 75 | 77.4 | 72.8 |

Once again, the data shown in Table IV illustrates a substantial reduction in noise when the composite camshaft of the present invention is incorporated in a standard model 8 BRIGGS & STRATTON engine.

Finally, additional noise tests were run on a model 60102 BRIGGS & STRATTON engine in order to test six different composite camshaft assemblies made from production tooling. Table V summarizes the noise data obtained therefrom. The model 60102 engine included an infinite muffler and intake silencer and the readings were taken at 1 meter with no load on the engine drive shaft. In this test, the primary concern was with no load mechanical noise, and therefore the tests were run with an infinite muffler and intake silencer. All the no load test results are summarized in Table V.

TABLE V

Composite Camshaft Noise Tests
BRIGGS & STRATTON Model 60102 Engine
Infinite Muffler - Intake Silencer
1 Meter Energy Average (dB)
No Load

| Test | 3600 RPM | 3300 RPM | 3000 RPM | 2700 RPM | 2400 RPM |
| --- | --- | --- | --- | --- | --- |
| 1. Standard Metal Assembly | 79 | 78 | 77.5 | 76.4 | 75.5 |
| 2. 2-C1 Composite Nylon Assembly | 77.3 | 75.5 | 73.2 | 72 | 70.6 |
| 3. 2-C2 Composite Nylon Assembly | 75.6 | 74.4 | 72.8 | 71.3 | 69.5 |
| 4. 1-C1 Composite Nylon Assembly | 76.3 | 74.1 | 72.7 | 71.2 | 70.4 |
| 5. 1-C3 Composite Nylon Assembly | 76.1 | 74.1 | 73.1 | 71.2 | 69.6 |
| 6. 2-C3 Composite Nylon Assembly | 75.4 | 73.5 | 72.5 | 70.6 | 69.7 |
| 7. 1-C4 Composite Nylon Assembly | 75.7 | 73.6 | 72.7 | 71 | 69.4 |
| 8. 2-C1 Repeat | 77 | 74.7 | 72.8 | 71.3 | 69.3 |
| 9. Average (Tests 2–7) | 76.1 | 74.2 | 72.8 | 71.2 | 69.9 |
| 10. Average reduction from standard metal assembly | 2.9 | 3.8 | 4.7 | 5.2 | 5.6 |

As shown from the above data, there was almost a 3 decibel average noise reduction at 3600 rpms. The improvements increase with lowered engine speed until an average of about 5.6 decibels of noise reduction was obtained at 2400 rpm. One camshaft assembly, namely 2-Cl, did not perform as well as the others. The 2-Cl camshaft assembly was 1.5 decibel higher than the average of the other 5 camshaft assemblies at 3600 rpm. A later or second retest confirmed the higher noise levels. The character of the noise appeared to indicate some type of valve impact noise, and a careful check of the cams revealed a fairly large deviation of the exhaust cam profile for 2-Cl. This deviation would change the valve velocity and acceleration and could cause excessive noise from valve seat impact or lifter impact. However, even with all of the faults of the 2-Cl, the 2-Cl still tested 1.7 decibels quieter at 3600 rpm than the standard metal assembly.

The present invention thus provides a camshaft assembly for engine use which has numerous advantages with quiet operation and low manufacturing costs being two of the most desirable advantages.

Various modes of carrying out the invention are contemplated as being within the scope of the following claims particularly pointing out and distinctly claiming the subject matter which is regarded as the invention.

I claim:

1. A camshaft assembly (1) for an internal combustion engine, comprising:

a camshaft (5) defining an axis of rotation (6);

a cam lobe (3, 4) mounted on said shaft (5) for rotation therewith, said cam lobe (3, 4) having a first axial end (11, 11a) that extends a first radial distance (35, 35a) from said axis (6);

a second axial end (12, 12a) that extends a second radial distance (41, 41a) from said axis (6);

a crowned cam profile (8, 9) formed in a peripheral surface of said cam lobe (3, 4), said cam profile (8, 9) including a shoulder (10, 32) located between said first (11, 11a) and second ends (12, 12a) which extends a third radial distance (37, 37a) from said axis of rotation (6) that is equal to or greater than said first (35, 35a) and second (41, 41a) radial distances; and first (13, 13a) and second (14, 14a) tapered surfaces that extend parallel to one another, said first tapered surface (13, 13a) extending axially from said first end (11, 11a) to said shoulder (10, 32) and said second tapered surface (14, 14a) extending axially from said shoulder (10, 32) to said second end (12, 12a).

2. The camshaft assembly (1) of claim 1 wherein said third radial distance (37, 37a) is greater than said first radial distance (35, 35a) and equal to said second radial distance (41, 41a).

3. The camshaft assembly (1) of claim 1 wherein both said camshaft (5) and said cam lobe (3, 4) are composed of a plastics material.

4. The camshaft assembly (1) of claim 3 wherein said camshaft (5) and cam lobe (3, 4) are composed of a one-piece molded plastics construction.

5. The camshaft assembly (1) of claim 4 wherein said plastics material is a nylon based material.

6. The camshaft assembly (1) of claim 1 wherein said camshaft (5) is composed of a metallic material and said cam lobe (3, 4) is composed of a plastics material.

7. The camshaft assembly (1) of claim 6 further including a hollow sleeve (7) surrounding said camshaft (5), said sleeve (7) and cam lobe (3, 4) being composed of a one-piece plastics construction.

8. A one-piece, all-plastics camshaft assembly (1) for an internal combustion engine, comprising:

a hollow camshaft (5, 5a) composed of a plastics material defining an axis of rotation (6) and including journal members (16, 17) on opposite ends thereof;

a cam lobe (3, 4) composed of said plastics material integral with said camshaft (5, 5a) and disposed axially between said journal members (16, 17), said cam lobe (3, 4) having a first axial end (11, 11a) that extends a first radial distance (35, 35a) from said axis (6);

a second axial end (12, 12a) that extends a second radial distance (41, 41a) from said axis (6);

a crowned cam profile (8, 9) formed in a peripheral surface of said cam lobe (3, 4), said cam profile (8, 9) including a shoulder (10, 32) located between said first (11, 11a) and second (12, 12a) ends which extends a third radial distance (37, 37a) from said axis of rotation (6) that is equal to or greater than said first (35, 35a) and second (41, 41a) radial distances;

first (13, 13a) and second (14, 14a) tapered surfaces that extend parallel to one another, said first tapered surface (13, 13a) extending axially from said first end (11, 11a) to said shoulder (10, 32) and said second tapered surface (14, 14a) extending axially from said shoulder (10, 32) to said second end (12, 12a); and a cam gear (2) composed of said plastics material integral with said camshaft (5) and disposed axially between one of said journal members (16, 17) and said cam lobe (3, 4).

9. The camshaft assembly (1) of claim 8 wherein said third radial distance (37, 37a) is greater than said first radial distance (35, 35a) and equal to said second radial distance (41, 41a).

10. The camshaft assembly (1) of claim 8 wherein said plastics material is a nylon-based material.

11. The camshaft assembly (1) of claim 8 wherein said cam gear (2) includes a plurality of axially extending, radially projecting teeth (4b) disposed circumferentially about its periphery, said teeth (4b) being tapered along their axial length so that their radially outer first distance (47) from axis (6) at one side (48) of said gear (2) is less than the radially outer second distance (49) from axis (6) at the other side of said gear (2).

* * * * *